(12) United States Patent
von Tetzchner (10) Patent No.: US 7,730,484 B2
(45) Date of Patent: Jun. 1, 2010

(54) METHOD AND DEVICE FOR PROVIDING INTERFACES THAT ARE TAILORED TO SPECIFIC DEVICES

(75) Inventor: Jon S. von Tetzchner, Oslo (NO)

(73) Assignee: Opera Software ASA, Oslo (NO)

( * ) Notice: Subject to any disclaimer, the term of this patent is extended or adjusted under 35 U.S.C. 154(b) by 1111 days.

(21) Appl. No.: 10/986,222

(22) Filed: Nov. 12, 2004

(65) Prior Publication Data

US 2006/0168388 A1 Jul. 27, 2006

(51) Int. Cl.
*G06F 9/445* (2006.01)
(52) U.S. Cl. ........................ 717/178; 717/173; 717/177; 715/744
(58) Field of Classification Search ......... 717/168–178; 715/744; 710/305
See application file for complete search history.

(56) References Cited

U.S. PATENT DOCUMENTS

| | | | | |
|---|---|---|---|---|
| 7,093,003 | B2 * | 8/2006 | Yuh et al. | 709/219 |
| 7,353,510 | B2 * | 4/2008 | Noirot-Nerin | 717/175 |
| 2002/0120721 | A1 * | 8/2002 | Eilers et al. | 709/220 |
| 2003/0051236 | A1 * | 3/2003 | Pace et al. | 717/177 |
| 2004/0113930 | A1 * | 6/2004 | Hawley et al. | 345/700 |
| 2005/0033763 | A1 * | 2/2005 | Chen et al. | 707/102 |
| 2007/0061488 | A1 * | 3/2007 | Alagappan et al. | 709/246 |
| 2008/0022276 | A1 * | 1/2008 | Coppinger et al. | 717/178 |

OTHER PUBLICATIONS

Evaluating multi-port frame buffer designs for a mesh-connected multicomputer, Stoll, G.; Bin Wei; Clark, D.; Felten, E.W.; Kai Li; Hanrahan, P., 1995, IEEE, pp. 96-105.*
Migratable user interfaces: beyond migratory interfaces, Grolaux, D.; Van Roy, P.; Vanderdonckt, J., 2004, IEEE, pp. 422-430.*

* cited by examiner

*Primary Examiner*—Wei Y Zhen
*Assistant Examiner*—Satish Rampuria
(74) *Attorney, Agent, or Firm*—Birch, Stewart, Kolasch & Birch, LLP (57) ABSTRACT

A generic interface device may operate as an interface with different types of electronic data devices that perform data operations. The interface device may establish communications with one of these data devices, and identify the particular type of data device based on data received from the data device. Using the identified type of data device, the interface device downloads a suitable computer program from a server. By executing the downloaded program, the interface device is able to obtain, understand and output specialized data produced by the data device.

49 Claims, 6 Drawing Sheets

METHOD AND DEVICE FOR PROVIDING INTERFACES THAT ARE TAILORED TO SPECIFIC DEVICES

BACKGROUND OF THE INVENTION

1. Field of the Invention

The present invention relates to an interface for electronic devices, and more particularly, to a method of downloading a compatible computer program to interface with a particular type of electronic device.

2. Description of Relevant Art

Today, various personal electronic devices provide users with different types of specialized information. Such devices are often portable, handheld devices, which include a liquid crystal display (LCD) screen and keypad. They typically contain a specialized user interface, or viewer application for presenting data to the user and helping the user interact with the available data.

A typical example of such devices is a Global Positioning System (GPS) receiver that provides information regarding a user's location. Another example is a portable sensor for measuring physiological data, e.g., a jogger's pulse. Also, in addition to its telecommunication functionality, a mobile phone displays specialized information regarding its battery level and signal strength.

A person using more than one of these devices will be carrying around redundant sets of hardware. For example, to use multiple personal devices, the person will likely need to carry around multiple screens and keypads. This can be impractical for the user. Also, providing the same hardware for multiple electronic devices increases the costs of the devices.

SUMMARY OF THE INVENTION

The present invention is directed to an interface device for downloading a suitable computer program to be executed in order to output the specialized data generated by a particular type of electronic device. The present invention is further directed to a method for downloading such a computer program to the interface device.

According to an exemplary embodiment, an interface device is configured to communicate with one or more types of "data devices," i.e., electronic devices that perform one or more data operations (storing, sensing, converting, processing, etc.). In an exemplary embodiment, the interface device identifies the particular type of data device with which it communicates, and downloads a computer program that is compatible with the particular type of data device. By executing the downloaded program, the interface device is capable of receiving and outputting the specific type of data generated by the particular type of data device.

In an exemplary embodiment, a set of computer programs are stored on one or more servers, each computer program being compatible with one or more types of data devices. In an exemplary embodiment, the server(s) are accessible to the interface device via a network connection (e.g., the Internet). Thus, when the interface device has identified a particular type of data device, it can download a compatible computer program from a server via the network connection. Once downloaded, the computer program can be executed in order to allow the interface device to retrieve and output specialized data from the data device.

According to an exemplary embodiment, the interface device is configured to receive type data from a data device while performing a handshake protocol to establish a communication session with the data device. During the handshake, the interface device may receive "type data" from the data device, which is used to identify the particular type of data device with which the interface device is communicating. For instance, the type data may include a particular code ("type code") used for identifying the type of data device.

After identifying the particular type of data device from the type data, the interface device may generate a message to be sent to the server(s) via the network connection. This message may identify the particular type of data device to the server(s). For example, such a message may include a type code received from a data device. Using this message, the server(s) may determine which of the stored computer programs are compatible with the identified type of data device, and generate indicia (e.g., a list) of the compatible computer programs to be sent back to the interface device. Based on this indicia, the interface device may be configured to choose one of the computer programs to be downloaded from the server(s) over the network connection.

In an exemplary embodiment, the computer programs stored on the server(s) may include programs, which are designed to read the specific data variables and utilize the primitives associated with compatible data devices. Such application programs may include routines for outputting the specialized data in an appropriate format, e.g., in visual form (alpha-numerical data, images, bar-graphs, etc.), audible form (e.g., spoken words or other sounds), haptic form (e.g., vibrations), or any combination thereof.

The servers may also store other types of computer programs compatible with different types of data devices. As an example, a compatible computer program may take the form of a device driver. Alternatively, the server(s) may store other forms of executable code such as a set of one or more routines, primitives, event handlers, interrupt mechanisms, or any combination thereof.

In an exemplary embodiment, the interface device is a generic electronic device that allows a user to interface with different types of data devices that generate different types of specialized data. In a particular exemplary embodiment, the interface device may be a mobile telephone that includes a standardized port for communicating with different types of data devices.

BRIEF DESCRIPTION OF THE DRAWINGS

Exemplary embodiments of the present invention will become more fully understood from the detailed description given hereinbelow and the accompanying drawings. These drawings are given by way of illustration only and, thus, are not limiting on the present invention. In these drawings, like reference numerals represent like elements, wherein.

DETAILED DESCRIPTION OF EXEMPLARY EMBODIMENTS

The present invention is directed to a generic interface device capable of interfacing with different types of data devices. According to the present invention, the interface device identifies a particular type of data device with which it is communicating, and downloads a suitable computer program that allows the data device to output the specialized data associated with that particular type of data device.

Figure 1:
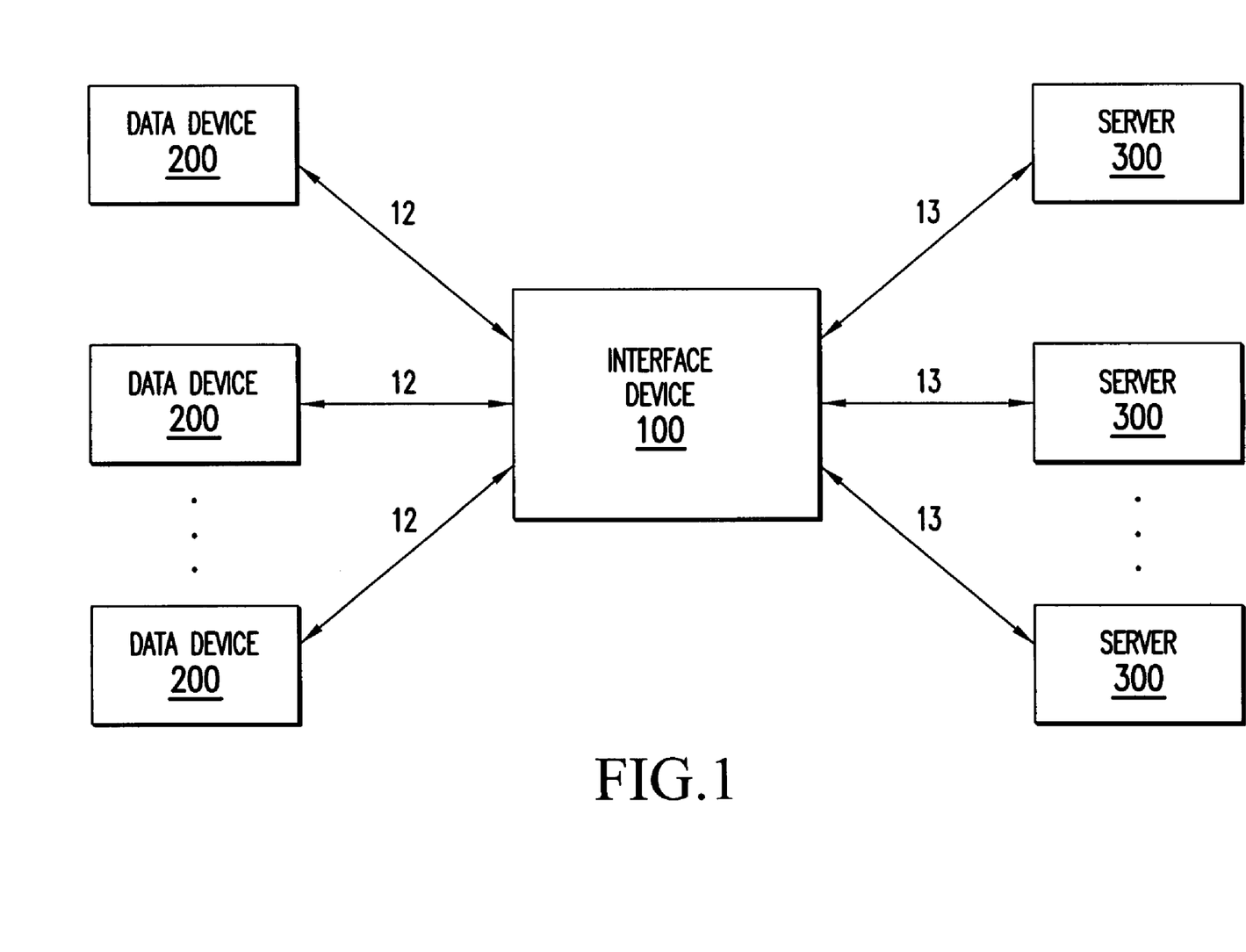
FIG. 1 is a diagram illustrating a system including an interface device, one or more servers, and one or more data devices, according to an exemplary embodiment of the present invention.

FIG. 1 is a block diagram illustrating a system for implementing the present invention, according to an exemplary embodiment. In FIG. 1, the system includes an interface device 100, one or more data devices 200, and one or more servers 300. According to an exemplary embodiment, the interface device 100 is capable of establishing a communication link 12 with each data device 200. For instance, the communication link 12 between the interface device 100 and a data device 200 may be implemented as a communication channel in a wireless protocol designed for short-range communications between portable and stationary devices. Examples include the radio communication protocol named BLUETOOTH, and the infrared communications protocol promoted by the Infrared Data Association (IrDA). Alternatively, the communication link 12 may be a physical link, e.g., a serial connector. For example, a link 12 may use the Universal Serial Bus (USB) or RS-232 protocol.

As such, the interface device 100 may include one or more standardized communication ports for communicating with data devices 200. For instance, the interface device 100 may include, for example, a BLUETOOTH port, an IrDA port, a USB port, and/or a RS-232 port.

FIG. 1 also shows that the interface device 100 is configured to communicate with each of the one or more servers 300 via communication link 13. According to an exemplary embodiment, this communication link 13 may provide a network connection between the interface device 100 and the corresponding server 300. However, the communication link 13 is not limited to network connections, and may include other types of communication links. Also, the communication link 13 may include a combination of network and non-network links.

For instance, a wireless or wire-based Internet connection may be used to communicatively connect the interface device 100 to a server 300. However, it should be readily apparent to those of ordinary skill in the art that other types of networks may be used to link the interface device 100 to each of the servers 300. Furthermore, where multiple servers 300 are available to the interface device 100, different types of networks may be used to link the interface device 100 to different servers 300.

In an exemplary embodiment, a communication link 13 is readily available for communications with the corresponding server 300, as needed by the interface device 100. For instance, as soon as the interface device 100 establishes communications with a particular data device 200 and identifies the type of data device 200, the interface device 100 may use communication link 13 to notify one or more servers 300 and download a compatible computer program.

However, in an alternative embodiment, the communication link 13 may not be immediately available after the interface device 100 has identified the particular type of data device 200, thereby requiring the interface device 100 to wait until one or more servers 300 are available. In another exemplary embodiment, there may be a predetermined time period at which communications between the interface device 100 and the server(s) 300 are to be commenced.

According to an exemplary embodiment, the interface device 100 may be connected to the server(s) 300 via any of various types of methods as will be contemplated by those of ordinary skill in the art. For instance, the communication link 13 between the interface device 100 and server(s) 300 might utilize wireless and wire-based communication protocols, such as BLUETOOTH, IrDA, and USB.

It should further be noted that the communication link 13 between interface device 100 and server 300 may include any combination of wireless and wire-based links, as well as any combination of network equipment and nodes. In fact, this link 13 may utilize multiple network protocols.

An example of this is as follows. The interface device 100 may be connected to a first Internet Service Provider (ISP) via a standard telephone network (Public Switched Telephone Network (PSTN)). The first ISP may be connected to a second ISP via a T1 line. The second ISP may include Digital Subscriber Line (DSL) connections to one more of the servers 300. However, those of ordinary skill in the art will realize that many other combinations of network (and non-network) links may be implemented in communication link 13.

It should also be noted that the communication link 12, which connects the interface device 100 to a data device 200, may similarly utilize any combination of links, networks, nodes, equipment, and protocols, as will be contemplated by those of ordinary skill in the art.

According to an exemplary embodiment, the interface device 100 may be configured as a portable electronic device for outputting data to a user. The interface device 100 may be a standalone device for interfacing with data devices 200. Alternatively, the interface device 100 may be configured for other applications. For example, the interface device 100 may be a mobile telephone, which includes a speaker and an LCD display for outputting audio and visual information. Alternatively, the interface device 100 may be a Personal Digital Assistant (PDA) device or a laptop computer.

However, the interface device 100 is not limited to portable devices. In an alternative exemplary embodiment, the interface device 100 may be configured as a relatively stationary device. As such, the interface device 100 may be configured as a desktop workstation, a public kiosk, etc. It should be noted that the interface device 100 is not limited to any particular size. According to another exemplary embodiment, the interface device 100 may use other output devices. For instance, the interface device 100 may plug into a television, a digital television receiver, an audio speaker, a digital projector, etc.

A more detailed description of the configuration and operation of the interface device 100 will be provided below in connection with FIG. 2.

As used in this specification, the term "data device" refers to any electronic device that calculates, stores, senses, converts, processes, analyzes, or performs any other operations on data ultimately to be output to a user. Hereafter, such operations will be referred to as "producing" data. According to exemplary embodiments, such data devices 200 may include, but are not limited to, the following: sensors (e.g., medical sensors for measuring blood pressure or pulse rate), signal receivers (e.g., GPS receivers), data storage devices (e.g., flash memory) or personal identification devices (e.g., Smart Cards, Radio Frequency Identification (RFID) chips).

Although the aforementioned lists of data devices 200 may suggest different types of portable electronic devices, the present invention is not thus limited. For instance, in an exemplary embodiment, the data device 200 may be a relatively stationary device, such as a personal computer, a public terminal, or kiosk. In fact, the types of data devices 200 covered by the present invention are not limited to any particular size or application.

According to an exemplary embodiment, a data device 200 is configured to transfer data via a communication link 12. Take for example a data device 200, which is a GPS receiver. Assuming that its corresponding communication link 12 to the interface device 100 is a BLUETOOTH wireless connection, the data device 200 will be configured to transfer GPS location coordinates via the BLUETOOTH connection to the interface device 100.

It should be understood that, in an exemplary embodiment of the present invention, the interface device 100 may communicate with different data devices 200 via different types of communication links 12. As such, the interface device 100 may be configured to use different communication protocols. Different types of data devices 200 may use the same protocol, or different protocols.

In a further exemplary embodiment, data devices 200 corresponding to the same type may use different types of communication protocols. For example, the interface device 100 may include both a wireless communication port (e.g., BLUETOOTH port) and a wire-based communication port (e.g., USB port). In this example, two separate data devices 200 may be configured as GPS receivers, one communicating via BLUETOOTH and the other via USB. As such, the same interface device 100 may be used as an interface for either of the GPS receivers, by downloading the appropriate computer program from the server(s) 300.

In a further exemplary embodiment, data devices 200 that use different communication protocols may still be compatible with the same computer program.

It is also envisioned that a single data device 200 may be configured to communicate via two or more communication protocols. This may allow a data device 200 to be used with different types of interface devices 100, which use different protocols.

Referring to FIG. 1, the one or more servers 300 are used for storing a plurality of computer programs available for downloading to the interface device 100. According to the exemplary embodiment, the invention may use dedicated servers 300 that are connected to the interface device 100 via communication link(s) 13. The one or more servers 300 may collectively store a plurality of computer programs, each of which enables the interface device 100 to obtain and output the specialized data produced by one or more specific types of data devices 200.

Each of these stored computer programs may be compatible with one or more types of data devices 200. As such, each program may be designed to read the specific data variables defined in a compatible data device 200, and utilize the specific primitives (low-level software instructions) supported by the compatible data device 200. Such a program, when executed by a processor in the interface device 100, allows the interface device 100 to obtain and output the specialized data generated by the compatible data device 200 in an understandable format.

The data produced by each type data device 200 will generally have specialized characteristics. In other words, each type of data device 200 will use a specific set of data types, variable names, numerical ranges, etc. to perform its data operations.

Each particular type of data device 200 is configured to produce data having specific output characteristics. For example, a data device 200 may produce data that corresponds to a visual output format. Common examples are numeric data and textual data. Other examples of data associated with a visual output format include image data, bar-graph data, and pie-graph data.

Also, some types of data devices 200 may produce data, which is appropriately output in an audible format. For instance, such data may be output as spoken words, music, or other sounds. Other types of data devices 200 may also produce data whose output format is haptic (i.e., relates to the sense of touch). Such data may be output as Braille words, vibrations, etc.

Accordingly, while the present specification refers to "types of data device," it should be readily apparent that each "type" is not necessarily limited to the hardware/software configuration of each data device 200. Instead, a data device's 200 "type" may refer solely to the characteristics of the data (variables, numerical/textual format, numerical range, etc.) produced by that data device 200.

As such, two data devices 200 that have very different hardware/software configurations may be identified by the same "type" according to an exemplary embodiment of the present invention. Likewise, two data devices 200 having very similar hardware configurations may be of different "types" because they produce data with different characteristics.

In fact, it is possible that the "type" associated with a data device 200 may change over time. In particular, if a particular data device 200 is required to change its mode of operation at a particular time, then it is possible that the characteristics of the data produced by the data device 200 will also be different. As such, an interface device 100 may need to use a different computer program to interface with the data device 200, when its mode of operation changes. For example, the data device 200 may be a computer workstation capable of executing different application programs, which produce different kinds of data. Accordingly, when the workstation changes the application program being executed (thereby changing its mode), the workstation may be identified as being a different "type" by the interface device 100.

In an exemplary embodiment, each computer program may be designed to obtain data that is produced by a compatible type of data device 200, and convert the data into the appropriate output format. For example, if the interface device 100 includes a display screen and a speaker, a program compatible with a GPS receiver may be adapted to retrieve data from the receiver and convert it into a displayed set of location coordinates. A computer program compatible with a satellite radio receiver may be adapted to obtain the data and convert it into music, speech, and other sounds.

It would be well understood by those of ordinary skill in the art how to design and compose such programs to obtain, understand, and output the data produced by various types of data devices 200. Furthermore, it will be readily understood by those of ordinary skill in the art that the computer programs stored in the server(s) 300 may be written as application programs, but are not thus limited. For instance, the server(s) 300 may include other types of executable code used by the interface device 100 for receiving and outputting the data generated by data devices 200. Such executable code may include device drivers, which are configured for particular types of data devices 200. Alternatively, the server(s) the executable code corresponding to a particular type of data device 200 may be a set of one or more routines, functions, primitives, event handlers, interrupt mechanisms, or any combination thereof.

Although not shown in FIG. 1, one or more of the servers 300 may maintain a database, or include some other means, which maintains an inventory of the stored computer programs. According to an exemplary embodiment, each server 300 may include a database (not shown) identifying each computer program it stores. The database records may also link each of the computer programs with the particular type(s) of data device(s) 200 with which it is compatible. In another exemplary embodiment, one of the servers 300 may maintain a database of all of the computer programs stored in a plurality of servers 300.

According to such embodiments, such databases may be used to generate some indicia (e.g., a list) of the computer programs that are compatible with a particular type of data device 200. Thus, the interface device 100 can identify a particular type of data device 200 and inform the server(s) 300. In response, the server(s) 300 may generate a list of compatible computer programs, and the interface device 100 may choose a program from the list to be downloaded. This process will be described in more detail below in connection with FIGS. 3a and 3b.

Figure 2:
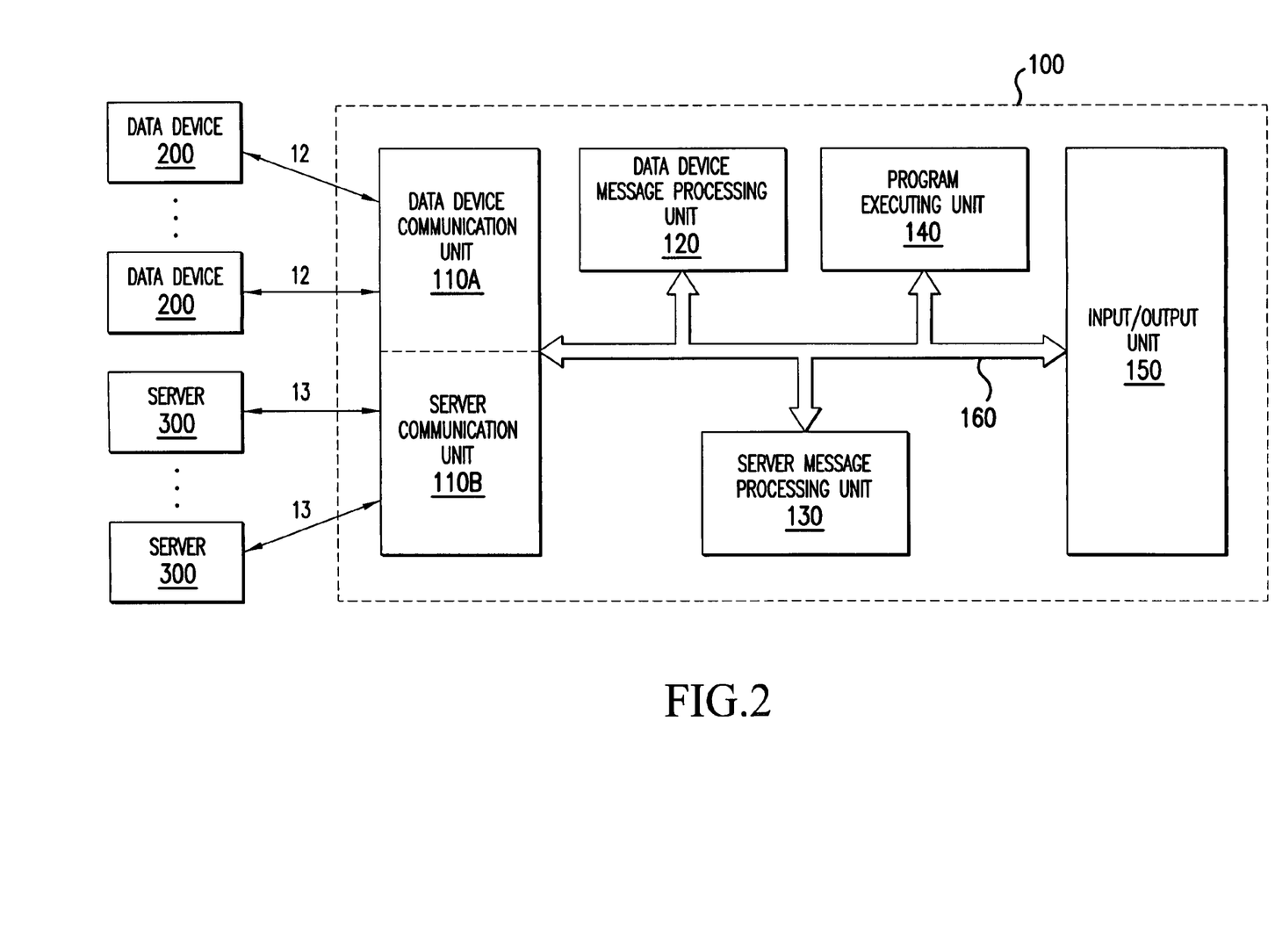
FIG. 2 is a diagram illustrating functional units of the interface device, according to an exemplary embodiment of the present invention.

FIG. 2 is a block diagram illustrating functional units of the interface device 100, according to an exemplary embodiment. It should be noted that the functional units 110-150 in this figure are provided to illustrate the general principles of operation for the interface device 100. These units 110-150 should not be construed as limiting the present invention to any particular structural or logical configuration. For instance, any function or operation described in relation to FIG. 2 is not limited to any particular configuration of hardware and/or software.

Thus, functions or operations associated with different functional units in FIG. 2 may be implemented using the same or different structural or logical components (e.g., hardware and/or software). Likewise, where multiple functions or operations are described in relation to a single functional unit, it should be noted that they may be implemented using different hardware and/or software components.

For purposes of this application, the term "logic" will be used to refer to any configuration of hardware components, software components, or circuitry, or any combination thereof, that can be used to perform a described function or operation. Thus, for each functional unit, the interface device 100 incorporates logic for implementing the corresponding functions/operations. (Although, as described above, the logic associated with different functional units may share common hardware and/or software components.)

It should also be noted that FIG. 2 is not meant to exhaustively show all of the functional units used in the interface device 100. Instead, FIG. 2 is merely illustrative of the basic units used for interfacing with one or more data devices 200 and downloading one or more compatible computer programs from the server(s) 300. It will be readily apparent to those of ordinary skill in the art that the interface device 100 may include various other functional units and components. This is especially true for embodiments where the interface device 100 is configured to perform operations other than interfacing with data device 200, e.g., to operate as a mobile phone, PDA, etc.

Referring to FIG. 2, the communication unit 110 communicatively links the interface device 100 to one or more data devices 200 and one or more servers 300 via links 12 and 13, respectively. In FIG. 2, the communication unit 110 includes a data device communication unit 110A that establishes and conducts communications with the data device 200.

Thus, the logic associated with the data device communication unit 110A may include a communication port operating according to the same protocol as the linked data device 200 (i.e., the protocol associated with the corresponding link 12). The associated logic may further include that which is necessary for establishing and maintaining a communication session with the linked data device 200. For example, unit 110A may be responsible for performing the handshake with the linked data device 200.

Similarly, the communication unit 110 in FIG. 2 includes a server communication unit 110B, whose logic establishes and performs communications with the one or more servers 300, via one or more communication links 13. Such logic may include a communication port that utilizes the particular network or communication protocol, e.g., Internet, associated with the corresponding communication link 13.

As indicated above, the data device communication 110A and server communication unit 110B are not necessarily implemented using different hardware, software, or logical components. Thus, the communication unit 110 may include a communication port that can be used either to communicate with a data device 200 or a server 300. For example, when such a port is not currently linked a server 300, it may be available for use with a data device 200, and vice versa. (Of course, this example assumes that both the data device 200 and server 300 are capable of using similar protocols.)

As stated above, the data device communication unit 110A may include logic for establishing communications with a data device 200. To establish such communications, a handshake may be performed between the data device communication unit 110A and the data device 200. Generally, this handshake is an exchange of messages between the interface device 100 and the data device 200 for establishing a communication session, in accordance with the particular protocol being used.

According to an exemplary embodiment, the data device 200 may be configured to send information to the data device communication unit 110A, which is used by the interface device 100 to identify the particular type of data device 200 with which it is communicating. This information is referred hereafter as "type data." For example, this type data may include a code, which uniquely identifies the particular type of data device 200 from other potential types of data devices 200 that are available. Such a code is referred hereafter as a "type code."

In an exemplary embodiment, the data device communication unit 110A may also include logic for detecting the presence of a data device 200 within a particular region, e.g., within the vicinity of the interface device 100. When a data device's 200 presence is detected, the data communication unit 110A may initiate a handshake with the detected data device 200. Furthermore, the data device communication unit 110A may include logic for sending a type data request during the handshake. The type data request is a message that requests the detected data device 200 to transmit type data to the interface device 100 via the communication link 12. For instance, if the communication link 12 is based on the BLUETOOTH protocol, the data device communication unit 110A may include logic to implement the Service Discovery Protocol (SDP) in BLUETOOTH to request the data device 200 to respond with type data, which identifies the particular type of data device 200 to the interface device 100.

According to an alternative exemplary embodiment, however, the data device 200 may be configured to detect the presence of the interface device 100 within its vicinity. After detecting the interface device's 100 presence, the data device 200 may initiate that handshake with the interface device 100. As such, the data device 200 may be configured to send type data to the data device communication unit 110A, without being prompted to do so, i.e., without receiving a type data request message.

However, other alternative embodiments may be implemented. For instance, the data device 200 may initiate the handshake, but wait until it receives a type data request before sending type data. Alternatively, the interface device 100 may initiate the handshake, but the data device 200 may send the type data, without waiting to receive a type data request. In another embodiment, the type data and type data requests may not be sent until after the initial handshake sequence is completed.

Referring to FIG. 2 the communication unit 110 is communicatively linked to the following units: a data device message processing unit 120, a server message processing unit 130, a program executing unit 140, and an input/output unit 150. As shown in FIG. 2, a data bus 160 may be implemented to communicatively link functional units 110-150. However, FIG. 2 is provided for the purpose of illustration only. It should be noted that the invention is not limited to the data bus 160 shown, and that any system of data lines or buses may be used to communicatively link the structural components associated with the various functional units 110-150 in the interface device 100.

According to an exemplary embodiment, the data device message processing unit 120 may include logic for processing messages received by the data device communication unit 110A from a data device 200 over an established link 12. In particular, the data device message processing unit 120 may extract the type data from a message received from the data device 200.

Furthermore, the data device message processing unit 120 may have logic for processing the extracted type data to identify the type of data device 200, according to an exemplary embodiment. However, in an alternative exemplary embodiment, the data device 200 may send type data, which does not require any processing to identify the data device's 200 type. For instance, the data device 200 may send a type code, which uniquely identifies the particular type of data device 200.

An exemplary use of type codes will now be described. A variety of different types of data devices 200 may be available to communicate with the interface device 100. As such, the server(s) 300 may store at least one computer program, which is compatible with each different type of data device 200. Thus, two or more of the stored programs may be compatible with different types of data devices 200. To facilitate the retrieval of a compatible computer program based on a particular type of data device 200, a different type code (e.g., a numerical or alphanumerical code) may be associated with each different type of data device 200. Thus, a server 300 could link each computer program to a compatible type code in, e.g., the server's 300 database.

Referring to FIG. 2, the server message processing unit 130 may include logic for generating a message, which identifies the particular type of data device 200, to be sent to the server(s) 300. If the received type data includes a type code, the server message processing unit 130 may only need to insert the type code into this message. In fact, the logic associated with server message processing unit 130 may merely generate a copy of the message including type data, which is received from the data device 200, so that the copied message will be sent to the server(s) 300.

In an exemplary embodiment, the server message processing unit 130 may include logic that controls, or otherwise causes, the server communication unit 110B to send the generated message to each server 300 connected to the interface device 100 by a link 13. According to alternative embodiments, the server communication unit 110B might broadcast the message to multiple servers 300, sequentially send the message to each of a plurality of servers 300, or send the message to a single server 300 that relays the message to other servers 300.

As discussed above, when a server 300 receives a message from link 13, which identifies a particular type of data device 200, the server may be configured to generate indicia (e.g., a list) of the stored computer programs that are compatible with the particular type. The server(s) 300 may then send these indicia back to the interface device 100.

However, in an alternative exemplary embodiment, server message processing unit 130 is configured to include additional information in the message sent to the server(s) 300. For instance, the message may include one or more criteria that are used by the server(s) 300 to choose a particular one of the computer programs, which are compatible with the particular type of data device 200 identified in the message. For instance, this criteria (referred hereafter as "selection criteria") may include predetermined rules for determining the most appropriate computer program to be downloaded to the interface device 100 when more than one of the stored computer programs are compatible with the identified type of data device 200.

In another exemplary embodiment, the selection criteria may, at least in part, include user designations, i.e., user preferences that are input to interface device 100. For example, the input/output unit 150 of the interface device 100 may include a user interface, that allows the user to indicate which computer program should be executed for various types of data devices 200. The interface device 100 may also allow the user to define some rules that are used for choosing a particular computer program from a plurality of compatible programs.

In an exemplary embodiment, the server(s) 300 includes logic for using the selection criteria to choose a particular program from a list of programs deemed to be compatible with the identified type of data device 200. In other embodiments, the server(s) may include logic for choosing a particular number of compatible programs, which best fit the selection criteria. For instance, the server(s) 300 may be configured to narrow the list of compatible programs down to the best three programs, from which the interface device 100 chooses a suitable program.

In an alternative embodiment, choosing a computer program from the indicia may be exclusively a function of the interface device 100. For instance, the program executing unit 140 may be adapted to perform this operation. It should be noted that if only one computer program is compatible with the identified type of data device 200, a server 300 may send a message to the interface device 100 identifying this single program (thereby causing the interface device 100 to download the identified program), or the server 300 may automatically transmit the program to the interface device 100, according to alternative embodiments.

According to an exemplary embodiment, the program executing unit 140 includes necessary logic for downloading and executing a computer program from the server(s) 300, which is compatible with the identified type of data device 200. The program executing unit 140 may also include logic for executing other system software, e.g., operating system and user interface programs. As such, the logic included in the program executing unit may include one or more computer processors for executing computer programs.

Consider the example where the interface device 100 is a mobile phone having a wireless Web capability. In such an embodiment, the program executing unit 140 may execute a World Wide Web browser or other type of browser program as a user interface, which allows the user to browse the Internet or other networks such as an intranet.

As indicated above, the program executing unit 140 may further include logic for using selection criteria to choose a particular computer program from a list of compatible computer programs. In such an embodiment, indicia of compatible computer programs are sent by the server(s) 300 and received by the program executing unit 140. For instance, the program executing unit 140 may process a set of rules that are programmed into the interface device 100.

Alternatively, the program executing unit 140 may include logic that uses the input/output unit 150 to output the list of compatible programs to the user, and allow the user to designate which computer program should be downloaded. For instance, the program executing unit 140 may generate a popup window on the display screen of the interface device 100 requesting the user to choose a program. In response, the use may input his/her choice using an input device (keypad, touch screen, etc.) associated with the input/output unit 150.

In a further embodiment, the program executing unit 140 may use a combination of rule-processing and user designations to choose the appropriate computer program to be downloaded and executed.

Also, it is envisioned that the server(s) 300, instead of sending indicia to the interface device 100, may simply transmit each compatible computer program to the interface device 100. Thereafter, the program executing unit 140 may simply choose and execute one of the transmitted programs.

As mentioned above, the program executing unit 140 also includes logic for executing the computer program to provide an interface with the particular type of data device 200. When executed, the computer program allows the interface device 100 to retrieve, or otherwise obtain, the specialized data produced by the data device 200 to be output to the user via the input/output unit 150. According to an exemplary embodiment, the data device 200 may be configured to periodically produce update data to be output by the interface device 100. Such updates may be obtained either periodically or continuously, while the computer program is executing. The input/output unit 150 may reflect such updates to the user.

In an exemplary embodiment, the input/output unit 150 is configured to output the specialized data from the data device 200 in an appropriate output format. As described above, the specialized data may be output as visual, audible, or haptic information, or as a combination thereof. Thus, the input/output unit 150 may include a display screen (e.g., liquid crystal display (LCD) screen) for visually outputting numerical and textual data, a speaker for outputting various sounds (speech, music, etc.), and haptic output devices.

The executed program may also be designed to provide a user interface tailored to the particular type of data device 200. Such a user interface may allow the user to choose the type of data, which is produced by the data device 200, to be received and output by the interface device 100. Also, the user may also be allowed to input data to the data device 200. Such input data may be converted into specialized data (i.e., converted to a format understandable by the data device 200) by the executed computer program. Accordingly, the program executing unit 140 may be in communication with both the communication unit 110 (e.g., to communicate and receive data from the data device 200) and the input/output unit 150, while the chosen computer program is executed.

As such, the input/output unit 150 may also include one or more types of input devices. Such devices may include a keypad, a microphone, a touch screen, a light pen to simulate writing on a screen, etc.

It should be noted that the functions/operations described above in connection with one or more of the functional units 110-150 of FIG. 2, may be performed by a computer program executed by the interface device 100. In an exemplary embodiment, operating system software in the interface device 100 may include instructions for performing such functions/operations. Alternatively, the functions and operations associated with one or more of the functional units 110-150 may be performed by instructions in other types of software executed by the interface device 100 (e.g., World Wide Web browser).

In another exemplary embodiment, certain ones of the functions/operations described in connection with FIG. 2 may be implemented using the operating system software, while others are implemented using the other software (e.g., Web browser). It should be noted that such software may be executed by one computer processor in the interface device 100, or by a plurality of computer processors. It will be readily apparent to those of ordinary skill in the art how to configure computer instructions to execute the functions associated with one or more of the functional units 110-150 shown in FIG. 2.

Operation of the interface device 100, in conjunction with a data device 200 and the one or more servers 300 will be described in more detail below in conjunction with FIGS. 3A, 3B, 4A, and 4B.

Figure 3A:
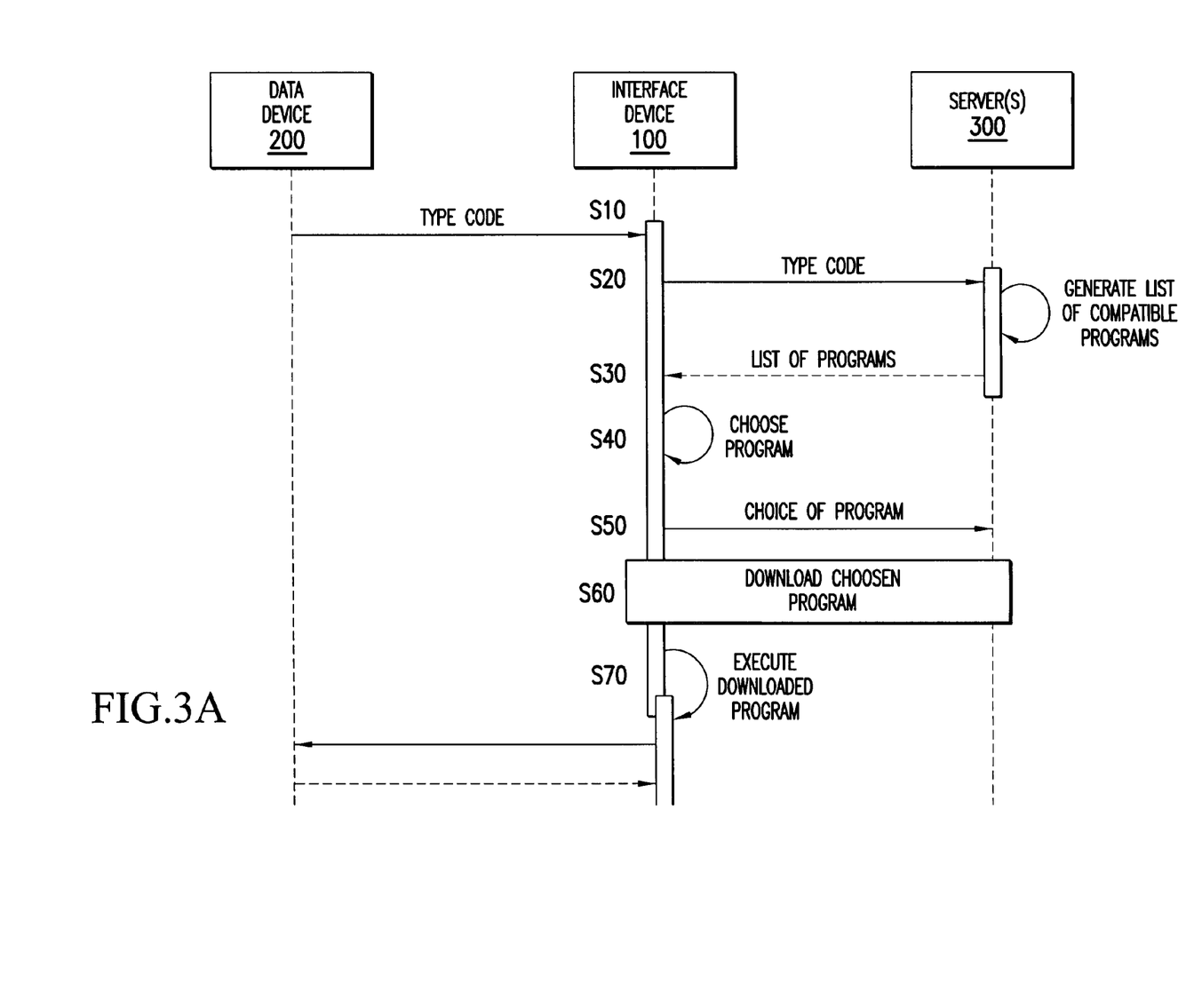
FIGS. 3A and 3B are sequence diagrams, each illustrating an alternative sequence of communications between an interface device, a data device and one or more servers, according to alternative exemplary embodiments of the present invention.
Figure 3B:
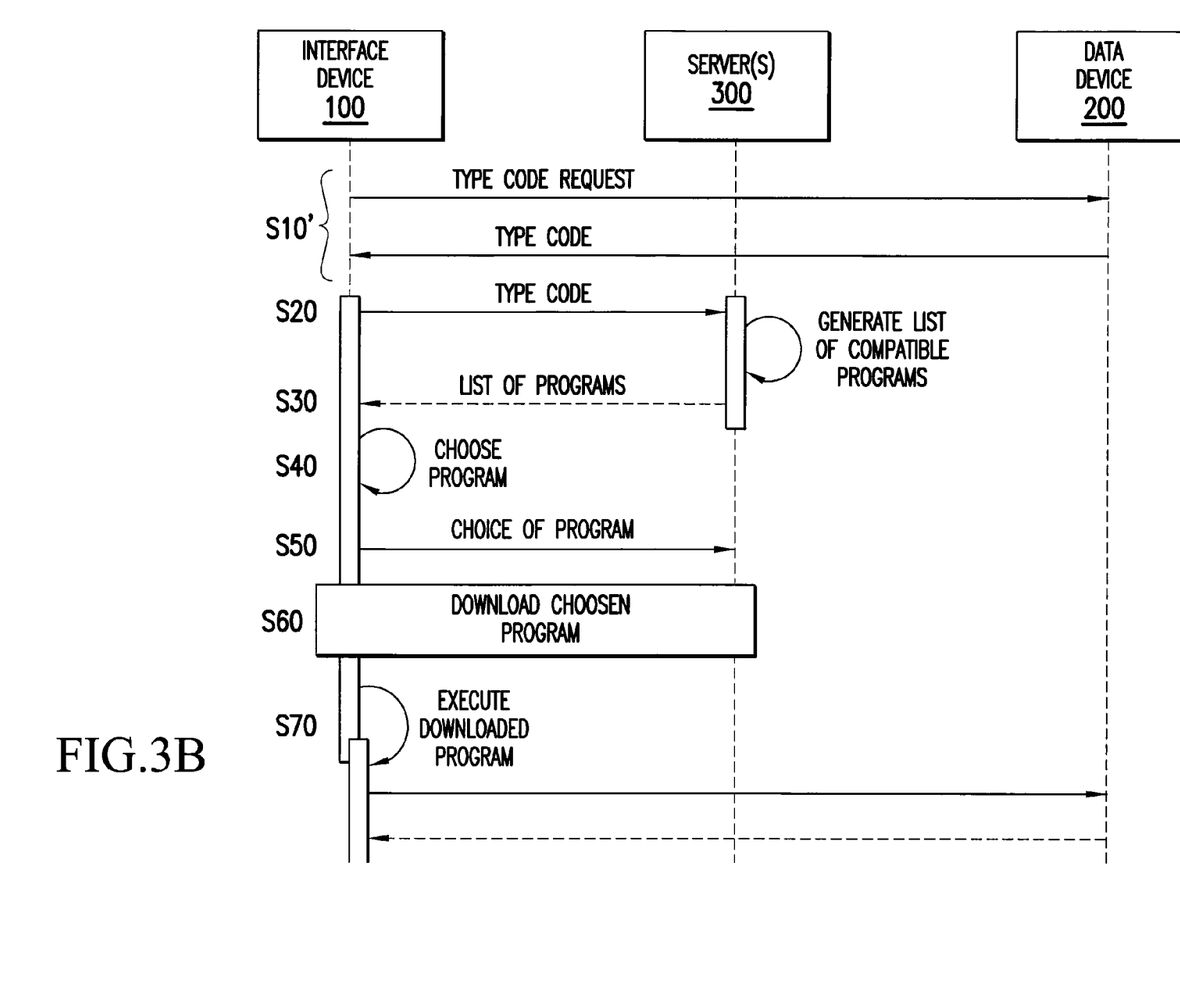

FIGS. 3A and 3B are sequence diagrams, each illustrating a sequence of communications between the interface device 100, a data device 200, and one or more server(s) 300, during which the interface device 100 to download and execute a suitable computer program. Specifically, FIGS. 3A and 3B illustrate alternative exemplary embodiments by which the interface device 100 receives type data from the data device 200.

FIG. 3A illustrates an embodiment where the data device 200 sends the type data to the interface device 100, without being prompted to do so by the interface device 100. According to an exemplary embodiment, as shown in S10, the type data sent by the data device 200 is a message including a type code. As explained above, this type code may be transmitted during a handshake to initiate a communication session.

In one exemplary embodiment, the handshake may be initiated after the interface device 100 detects the presence of the data device 200. Such detection may occur as a result of the interface device 100 and data device 200 being positioned in the same vicinity as one another (e.g., when the communication link 12 is a wireless link). Otherwise, where communication link 12 uses a wire-based or other physical connection, the interface device 100 may detect the data device 200 when the physical connection is made.

However, in an alternative embodiment, the data device 200 may detect the presence of the interface device 100 in the nearby vicinity, thereby initiating the handshake and prompting the data device 200 to send the type data message.

As illustrated in S20, the interface device 100 generates and sends a message to identify the particular type of data device 200 to the server(s) 300. For instance, as shown in FIG. 3A, the interface device 100 may relay the received type code to the server(s) 300. In response to receiving this message, the server(s) 300 may generate indicia of stored programs that are compatible with the identified type of data device 200. Such indicia may be sent back to the interface device 100 as a list of compatible programs, as shown in S30.

According to S40, the interface device 100 may choose a particular one of the compatible computer programs based on selection criteria, e.g., a set of rules and/or user designations. Thereafter, S50 shows that the interface device 100 may send a message to the server(s) 300 identifying the program that has been chosen for downloading. The actual downloading of the chosen program is shown in S60.

Thereafter, the interface device 100 may execute the downloaded computer program, as illustrated in S70. Thereafter, FIG. 3A illustrates messages being transmitted between the interface device 100 and the data device 200, as the interface device 100 is operating as an interface to the data device 200. For instance, the interface device 100 may receive specialized data, which is produced by the data device 200, to be output to the user. Also, the interface device 100 may receive data inputs from the user to be sent to the data device 200.

FIG. 3B illustrates an alternative exemplary embodiment where the interface device 100 sends a type data request to a data device 200, thereby prompting the data device 200 to return a message including a type code (or another kind of type data). This exchange, illustrated in S10' may be performed during a handshake between the devices 100 and 200.

The other communications and operations illustrated in S20-S70 of FIG. 3B are similar to the like numbered communications and operations in FIG. 3A. Thus, no further explanation of S20-S70 is necessary with respect to FIG. 3B.

As mentioned above, the present invention may be implemented using various different embodiments. For example, either the interface device 100 or the data device 200 may be configured to detect the presence of the other. Also, such detection may be a result of the interface device 100 and the data device 200 entering the same region or general vicinity (e.g., when they use a wireless protocol to communicate), or a result of a physical connection being established (e.g., the data device 200 is plugged into the interface device 100 using a USB cable).

Figure 4A:
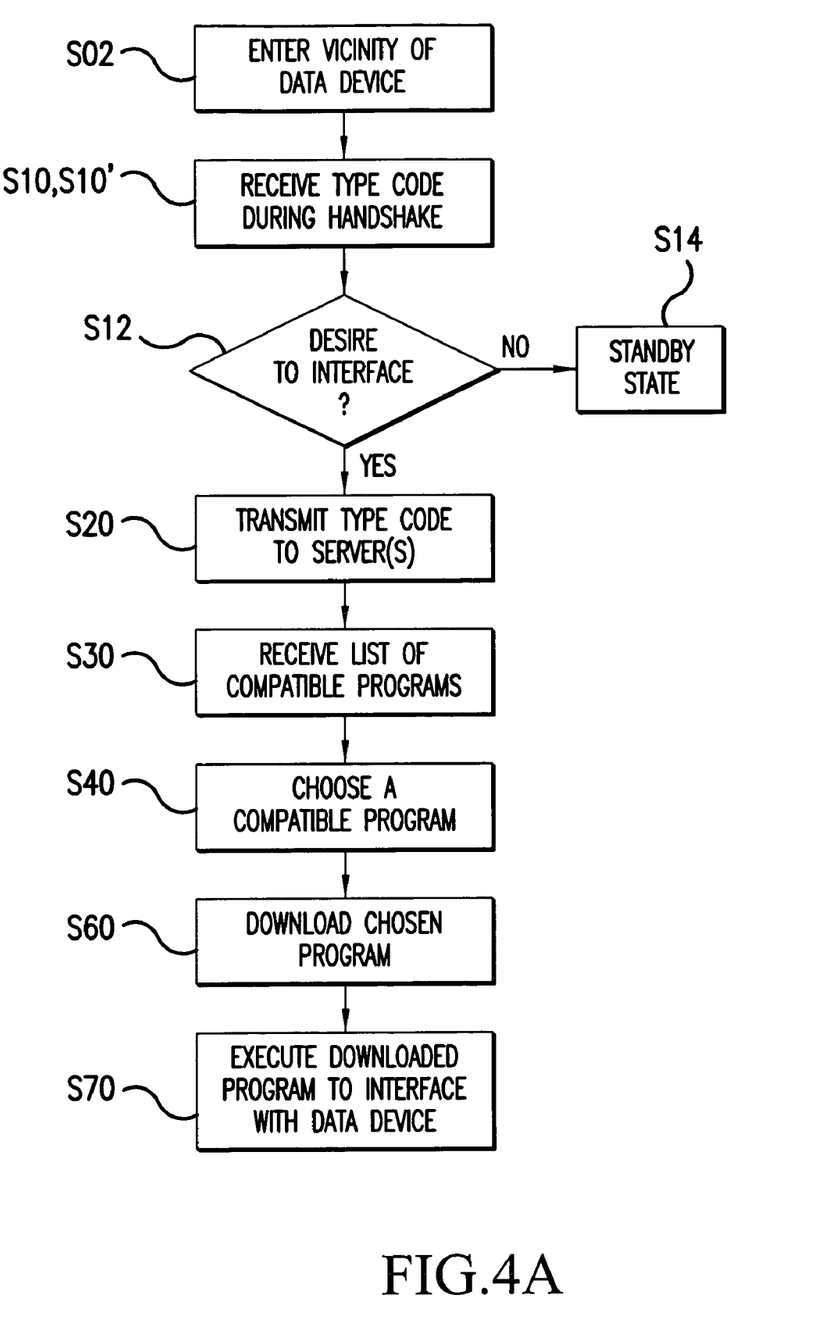
FIGS. 4A and 4B are flowcharts, each illustrating an alternative set of operations for downloading a computer program to the interface device, according to alternative exemplary embodiments of the present invention.
Figure 4B:
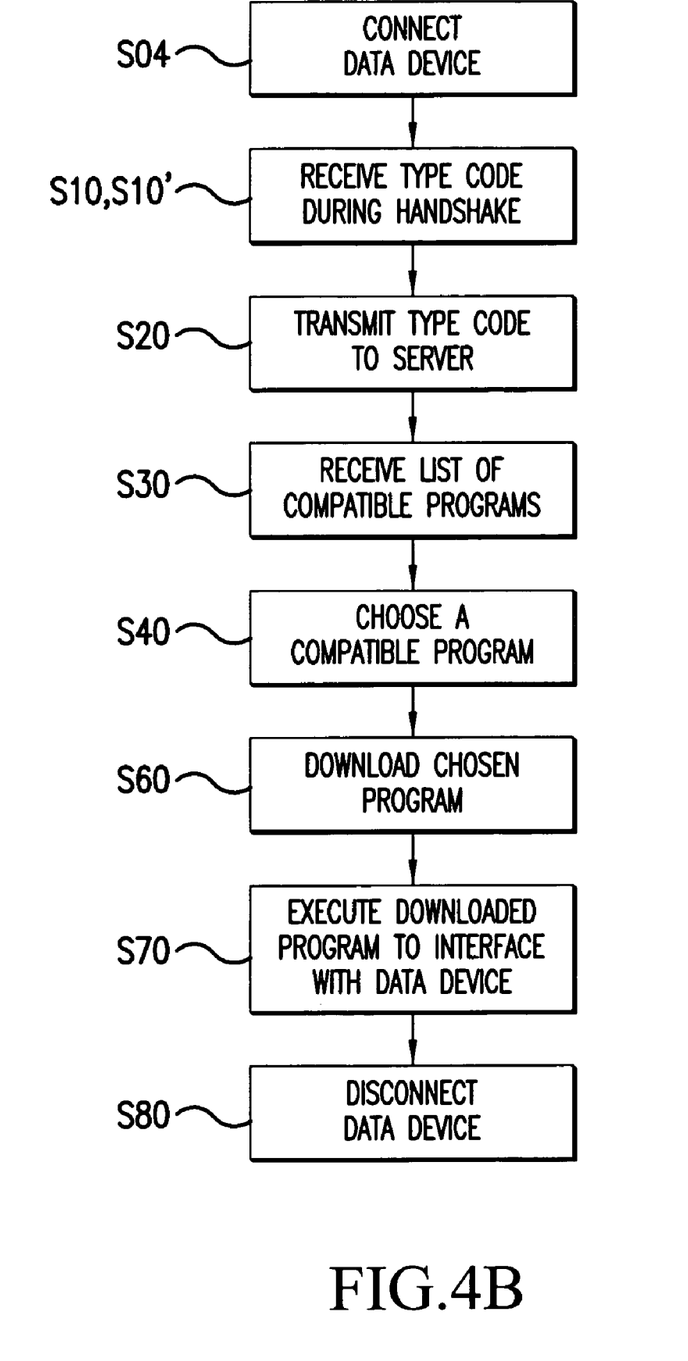

FIGS. 4A and 4B are flowcharts for illustrating operations to be performed in order for the interface device 100 to download a computer program compatible with a particular type of data device 200, according to exemplary embodiments. In particular, FIGS. 4A and 4B are flowcharts illustrating alternative series of operations for downloading a computer program to the interface device, according to alternative exemplary embodiments.

The embodiment of FIG. 4A particularly shows an embodiment where a wireless protocol is used by the devices 100 and 200, and at least one of the interface and data devices 100 and 200 detects the presence of the other within its vicinity. On the other hand, FIG. 4B illustrates an alternative embodiment consistent with FIG. 3B above, where the interface device 100 sends the type data request to the data device 200. Specifically, in FIG. 4B, the data device 200 is physically connected to the interface device 100 to initiate the handshake.

In FIGS. 4A and 4B, operations that are similar to those illustrated in FIG. 3A and/or FIG. 3B will be illustrated by like reference numbers. As will be evident below, certain operations will be described below, which were not discussed in relation to FIGS. 3A and 3B (i.e., S02, S12, S14 in FIG. 4A; and S04 in FIG. 4B).

Referring to FIG. 4A, S02 illustrates the interface device 100 entering the vicinity of the data device 200. In response, the handshake is initiated between the two devices 100 and 200. As shown in FIG. 4A, this handshake may be consistent either with S10 in FIG. 3A, whereby the data device 200 sends the type code to the interface device 100 without receiving a type data request, or with S10' in FIG. 3B, in which the interface device sends the type data request.

In FIG. 4A, after the interface device 100 receives the data device's 200 type code, the interface device 100 may prompt the user to indicate whether the user desires to interface with the particular type of data device 200, which sent the type code. This is shown in S12. According to an exemplary embodiment, the interface device 100 may launch a popup window on a display to ask permission from the user to interface with the particular type of data device 200.

According to an exemplary embodiment shown in FIG. 4A, if the user chooses not to interface with the device (S14), the interface device 100 may enter a standby state, during which the session is maintained with the data device 200 even though a compatible computer program is not downloaded and executed. Thus, while the interface device 100 is in the standby state, the user may later indicate that he/she wants to interface with the data device 200, thus causing the interface device 100 to download and execute a compatible computer program. However, according to an exemplary embodiment (not shown), the session between the interface and data devices 100 and 200 may be terminated if the user chooses not to interface.

In FIG. 4A, if the user decides to interface with the data device 200, the interface device may transmit the type code to the server(s) 300, as shown in S20. In response, the interface device may receive a list of compatible computer programs (S30), and choose a particular program from the list (S40). Thereafter, the interface device 100 may download the chosen computer program from a particular server 300 (S60), and execute the downloaded program (S70).

A particular example of the embodiment in FIG. 4A will now be described. The interface device 100 is configured as a mobile phone that includes wireless Web capability. The mobile phone utilizes a World Wide Web browser as a user interface. In this example, the particular type of data device 200 is a GPS receiver, which may be installed, e.g., in a car, boat, or other vehicle. The mobile phone and GPS receiver are configured to communication using the BLUETOOTH protocol.

According to this example, when the user carries the mobile phone into the vicinity of the GPS receiver, a handshake will occur between the phone and receiver. During the handshake, the phone's operating system will use the Service Discovery Protocol (SDP) in BLUETOOTH to discover the type of device of the GPS receiver. Thereafter, the operating system will launch a popup window, asking permission to download an application program to view data from the GPS receiver. If the user agrees, the mobile phone will send a message, via a wireless Web connection, requesting servers 300 for a compatible application program. Thereafter, a compatible application is downloaded to the phone from a particular server 300 in the form of a Hypertext Markup Language (HTML) page, in which an executable script code is embedded (e.g., code written in JavaScript). The script code is thereafter executed to display current GPS coordinates on the phone's LCD screen.

Of course, the above example is provided for purposes of illustrating a possible implementation of the embodiment in FIG. 4A, and should not be construed as limiting the present invention in any way.

As mentioned above, an alternative embodiment is shown in FIG. 4B, in which the user physically connects a particular type of data device 200 to the interface device 100. This is shown in S04. For instance, a USB cable or RS-232 cable may be used. In an exemplary embodiment, the handshake between the interface and data devices 100 and 200 is initiated as soon as the physical connection is made. This handshake may be similar to either of S10 and S10' described above in connection with FIGS. 3A and 3B, respectively.

In the exemplary embodiment illustrated in FIG. 4B, it may be assumed that by connecting the data device 200 to the interface device 100, the user has confirmed his/her desire for the two devices 100 and 200 to interface. Thus, the interface device is not required to ask the user for permission to download a compatible computer program. In other words, there is no need to perform a similar operation as S12 in FIG. 4A.

As shown in FIG. 4B, the interface device 100 receives the type code during the handshake (510, S10'). The other operations S20-S80 in FIG. 4B are performed similarly as in the embodiment of FIG. 4A (as well as the embodiments of FIGS. 3A and 3B). Thus, the interface device 100 relays the type code to the server(s) 300 (S20), chooses from a received list of compatible computer programs (S30-S40), and downloads and executes the chosen computer program (S60-S70).

A particular example of the embodiment in FIG. 4B will now be described. Similar to the earlier example, the interface device 100 may be implemented as a mobile phone. However, it may be carried from a patient who is suffering, e.g., from diabetes. Thus, the patient may also carry around a data device 200, which is a blood glucose sensor that measures the glucose level in the patient's blood vessel. Such a data device 200 may be an intravenous sensor inserted into the blood vessel, or a sensor that uses laser technology to sample the patient's blood. The sensor may include a microchip for reading and analyzing the glucose level information.

Thus, in this example, whenever the patient wants to check his/her condition, he/she may use a USB connection to communicatively link the sensor to a USB port on his/her mobile phone. Thereafter, the operating system on the phone identifies the type of linked device, and composes a message to be sent to one or more server(s) using a wireless Web connection. Since this message identifies the device type of the sensor, the server(s) 300 are able to determine whether a compatible application program is available. An appropriate application program is then downloaded in the form of a plug-in or script to be executed on the World Wide Web browser of the phone.

The above example merely provides a possible implementation of the embodiment of FIG. 4B and, thus, is not limiting on the present invention.

It should be noted that the present invention may be implemented in ways that vary from the above-described embodiments without departing from the spirit and scope of the invention.

For instance, even though exemplary embodiments describe the interface device 100 acting as an interface to one data device 200 at a particular time, these embodiments are merely illustrative. In an exemplary embodiment, the interface device 100 may simultaneously operate as an interface with multiple types of data devices 200. In such an embodiment, the interface device 100 may be operable to maintain communication sessions with multiple types of data devices 200, and to simultaneously execute computer program compatible with these different types of devices.

In a further embodiment, it will be envisioned that the interface device 100 may be connected to multiple data devices 200, and that only one compatible computer program need be downloaded and executed to provide an interface to each of the devices.

As such, the present invention is intended to cover all variations and modifications that would be obvious to one of ordinary skill in the art. Such variations are not to be regarded as a departure from the spirit and scope of the invention, and are intended to be included within the scope of the following claims.

What is claimed is:

1. An interface device comprising:

one or more communication units including one or more communication ports for communicating with one or more types of data devices and one or more remote servers, each of the one or more types of data devices being adapted to produce specialized data, and the one or more remote servers being adapted to store a plurality of computer programs; and at least one computer processor for executing:

a first software module for processing type data received by the communication unit from a data device separate from the interface device in order to identify which of the one or more types of data devices corresponds to the separate data device; and a second software module for executing one of the computer programs, which is downloaded from the one or more remote servers via the communication unit, the executed computer program being chosen based on the identification of the type of data device corresponding to the separate data device; and an output device, wherein:

each stored computer program is compatible with at least one of the one or more types of data devices, each stored computer program being adapted to output the specialized data of a compatible type of data device when executed by the second software module, the executed computer program being compatible with the identified type corresponding to the separate data device, at least one of the one or more communication ports receives specialized data from the separate data device, and the computer program executed by the second software module causes the output device to output the specialized data received from the separate data device.

2. The interface device of claim 1, wherein the at least one computer processor further executes:

a third software module including logic for generating a message that identifies which of the one or more types of data device corresponds to the separate data device, and for controlling the communication unit to send the generated message to the one or more remote servers.

3. The interface device of claim 2, wherein at least two of the stored computer programs are compatible with different ones of the one or more types of data devices, the received type data includes a code uniquely identifying the type of data device corresponding to the separate data device with respect to the others in the one or more types of data devices, and the third software module is adapted to include the code in the generated message.

4. The interface device of claim 3, wherein the one or more remote servers generate indicia of stored computer programs, which are compatible with the identified type corresponding to the separate data device, based on the code, and the second software module is adapted to receive the indicia of compatible computer programs, and use selection criteria to choose one of the compatible computer programs from the received indicia to be downloaded and executed.

5. The interface device of claim 4, further comprising:
an input unit adapted to receive designations from a user, wherein the selection criteria includes a received designation from the user regarding which of the compatible computer programs should be downloaded.

6. The interface device of claim 4, wherein
the communication unit is adapted to send the generated message to a plurality of remote servers.

7. The interface device of claim 3, wherein the third software module is adapted to include selection criteria in the generated message in addition to the code, the selection criteria being used by the one or more remote servers to choose one of a plurality of compatible computer programs to be downloaded and executed by the second processing unit.

8. The interface device of claim 1, wherein
the communication unit is adapted to send a type data request to the separate data device, the type data being sent from the separate data device in response to the type data request.

9. The interface device of claim 8, wherein the communication unit is adapted to detect a presence of the separate data device in the interface device's vicinity, the communication unit being adapted to send the type data request when the presence of the separate data device is detected.

10. The interface device of claim 1, the interface device being a mobile telephone.

11. The interface device of claim 1, wherein the communication unit includes a standardized port for communicating with each of the one or more types of data devices.

12. The interface device of claim 1, wherein the communication unit is adapted to communicate with the one or more remote servers via the Internet.

13. The interface device of claim 12, wherein the second software module includes logic for executing a browser, the executed computer program being configured as at least one of a plug-in and script, which is executed on the browser.

14. The interface device of claim 1, further comprising:
an input unit adapted to receive user designations used by the executed computer program to obtain and output the specialized data of the separate data device.

15. An interface device, comprising:
one or more communication units including one or more communication ports for communicating with one or more types of data devices and one or more remote servers, each of the one or more types of data devices being adapted to produce specialized data, and the one or more remote servers being adapted to store a plurality of computer programs;
at least one computer processor for executing:
a first software module for processing type data received by the communication unit from a data device separate from the interface device in order to identify which of the one or more types of data device corresponds to the separate data device;
a second software module for executing one of the computer programs, which is downloaded from the one or more remote servers via the communication unit, the executed computer program being chosen based on the identification of the type of data device corresponding to the separate data device; and
an output unit adapted to output the specialized data of the one or more types of data devices in at least one of the following formats: visual, audible, and haptic,
wherein:
each stored computer program is compatible with at least one of the one or more types of data devices, each stored computer program being adapted to output the specialized data of a compatible type of data device when executed by the second software module, the executed computer program being compatible with the identified type corresponding to the separate data device,
at least one of the one or more communication ports receives specialized data from the separate data device, and
the computer program executed by the second software module causes the output unit to output the specialized data received from the separate data device in at least one of the visual, audible, and haptic formats.

16. The interface device of claim 1, the interface device being a handheld device.

17. A method performed in an interface device for outputting specialized data comprising:
receiving via a communication port, type data from a data device separate from the interface device, the separate data device being of a particular type of data device;
processing by a computer processor, the received type data in order to identify the particular type of data device;
downloading a computer program from one or more remote servers that stores a plurality of computer programs, each stored computer program being compatible with at least one type of data device, each stored computer program being adapted to output specialized data of a compatible type of data device when executed, the downloaded computer program being chosen based on identification of the particular type of data device;
receiving specialized data via a communication port from the separate data device; and
executing by a computer processor, the downloaded computer program to output the specialized data received from the separate data device.

18. The method of claim 17, at least two of the stored computer programs being compatible with different types of data devices, the method further comprising:
sending a message that identifies the particular type of data device to the one or more remote servers,
wherein the downloaded computer program is a computer program identified by the one or more remote servers in response to the sent message.

19. The method of claim 18, wherein
the receiving step receives from the separate data device a code uniquely identifying the particular type of data device from other types of data devices, and
the method further comprises:
inserting the code in the message to be sent to the one or more remote servers.

20. The method of claim 19, further comprising:
receiving indicia from the one or more remote servers of stored computer programs, which are compatible with the particular type of data device, the indicia being received in response to the sent message; and
using selection criteria to choose one of the compatible computer programs from the received indicia to be downloaded and executed.

21. The method of claim 20, further comprising:
receiving a designation from a user,
wherein the using step uses the received user designation to choose the compatible computer program to be downloaded and executed.

22. The method of claim 20, wherein the sending step sends the message to a plurality of remote servers.

23. The method of claim 22, wherein the receiving indicia step receives indicia of a set of compatible computer programs, which are distributively stored on at least two of the remote servers.

24. The method of claim 19, further comprising:
inserting selection criteria, in addition to the code, in the message to be sent to the one or more remote servers, the selection criteria including information to be used by the one or more servers to choose one of the stored computer programs, which is compatible with the particular type of data device, to be downloaded and executed.

25. The method of claim 17, further comprising:
sending a type data request to the separate data device, wherein the type data is sent from the separate data device in response to the type data request.

26. The method of claim 25, further comprising:
detecting a presence of the separate data device, and
sending the type data request to the separate data device in response to the detecting step.

27. The method of claim 17, wherein the downloading step downloads the stored computer program from the one or more remote servers via the Internet.

28. The method of claim 17, further comprising:
receiving user designations for use by the executed computer program to obtain and output the specialized data from the separate data device.

29. The method of claim 17, wherein the outputting step outputs the specialized data in at least one of the following formats: visual, audible, and haptic.

30. The method of claim 17, wherein the one or more types of data devices include sensors, the computer program being executed to output sensor data.

31. The method of claim 17, wherein the particular type of data device is one of: a Global Positioning System (GPS) receiver, and a blood glucose sensor.

32. A handheld interface device adapted to perform the method of claim 17.

33. A set of instructions encoded on a computer-readable storage device to be executed by one or more computer processors to cause an interface device to perform the following:
receive via a communication port, type data from a data device separate from the interface device, the remote data device being of a particular type of data device;
process by a computer processor, the received type data in order to identify the particular type of data device;
download a computer program from one or more remote servers that stores a plurality of computer programs, each stored computer program being compatible with at least one type of data device, each stored computer program being adapted to output specialized data of a compatible type of data device when executed, the downloaded computer program being chosen based on identification of the particular type of data device;
receive via a communication port, specialized data from the separate data device; and
execute via a computer processor, the downloaded computer program to output the specialized data received from the separate data device.

34. The set of instructions of claim 33, wherein
at least two of the stored computer programs are compatible with different types of data devices, and
the instructions are executed to further perform:
sending a message that identifies the particular type of data device to the one or more remote servers, the downloaded computer program being a computer program identified by the one or more remote servers in response to the sent message.

35. The set of instructions of claim 34, wherein
the received type data includes a code that uniquely identifies the particular type of data device from other types of data devices, and
the instructions are executed to further perform:
inserting the code in the message to be sent to the one or more remote servers.

36. The set of instructions of claim 35, wherein the instructions are executed to further perform:
receiving indicia from the one or more remote servers of stored computer programs, which are compatible with the particular type of data device, the indicia being received in response to the sent message; and
using selection criteria to choose one of the compatible computer programs from the received indicia to be downloaded and executed.

37. The set of instructions of claim 36, wherein the instructions are executed to further cause the interface device to:
receive a designation from a user, the received user designation being used to choose the compatible computer program to be downloaded and executed.

38. The set of instructions of claim 36, wherein the message is sent to a plurality of remote servers.

39. The set of instructions of claim 38, wherein the received indicia identifies a set of compatible computer programs, which are distributively stored on at least two of the remote servers.

40. The set of instructions of claim 35, wherein the instructions are executed to further cause the interface device to:
insert selection criteria, in addition to the code, in the message to be sent to the one or more remote servers, the selection criteria including information to be used by the one or more remote servers to choose one of the stored computer programs, which is compatible with the particular type of data device, to be downloaded and executed.

41. The set of instructions of claim 33, wherein the instructions are executed to further perform:
sending a type data request to the remote data device, wherein the type data is sent from the remote data device in response to the type data request.

42. The set of instructions of claim 41, wherein the instructions are executed to further perform:
detecting a presence of the separate data device, and
sending the type data request to the particular type of device in response to the detecting step.

43. The set of instructions of claim 33, wherein the downloading of the computer program is performed via the Internet.

44. The set of instructions of claim 33, wherein the instructions are executed to further cause the interface device to:
receiving user designations for use by the executed computer program to obtain and output the specialized data from the separate data device.

45. The set of instructions of claim 33, wherein the specialized data is output in at least one of the following formats: visual, audible, and haptic.

46. The set of instructions of claim 33, wherein the one or more types of data devices include sensors, the computer program being executed to output sensor data.

47. The set of instructions of claim 33, wherein the particular type of data device is one of: a Global Positioning System (GPS) receiver, and a blood glucose sensor.

48. A handheld interface device that executes the set of instructions of claim 33.

49. The interface device of claim 1, further comprising a plurality of output devices for outputting the specialized data produced by different types of separate data devices in different formats, respectively, wherein the plurality of output devices include: a device for outputting the specialized data in audio format, and a device for outputting the specialized data in visual format.

* * * * *